(12) United States Patent
Zhang et al.

(10) Patent No.: US 11,590,412 B2
(45) Date of Patent: Feb. 28, 2023

(54) INFORMATION PROCESSING METHOD AND APPARATUS, STORAGE MEDIUM, AND ELECTRONIC DEVICE

(71) Applicant: NETEASE (HANGZHOU) NETWORK CO., LTD., Zhejiang (CN)

(72) Inventors: Yuan Zhang, Zhejiang (CN); Jingjing Yan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/763,587

(22) PCT Filed: Feb. 20, 2019

(86) PCT No.: PCT/CN2019/075557
§ 371 (c)(1),
(2) Date: May 13, 2020

(87) PCT Pub. No.: WO2019/174443
PCT Pub. Date: Sep. 19, 2019

(65) Prior Publication Data
US 2020/0398151 A1 Dec. 24, 2020

(30) Foreign Application Priority Data

Mar. 12, 2018 (CN) .......................... 201810200907.0

(51) Int. Cl.
*A63F 13/2145* (2014.01)
*A63F 13/42* (2014.01)
(Continued)

(52) U.S. Cl.
CPC .......... *A63F 13/2145* (2014.09); *A63F 13/42* (2014.09); *A63F 13/55* (2014.09);
(Continued)

(58) Field of Classification Search
CPC ...... A63F 13/2145; A63F 13/42; A63F 13/55; G06F 3/0488; G06F 2203/04104
See application file for complete search history.

(56) References Cited

U.S. PATENT DOCUMENTS 9,489,068 B2 * 11/2016 Niu .................... G06F 3/041
9,606,718 B2 * 3/2017 Matsushima ....... G06F 3/04817
(Continued)

FOREIGN PATENT DOCUMENTS

CN 104714691 A 6/2015
CN 105373336 A 3/2016
(Continued)

*Primary Examiner* — James S. McClellan
*Assistant Examiner* — Ross A Williams
(74) *Attorney, Agent, or Firm* — YU Gang

(57) ABSTRACT

An information processing method and apparatus, a storage medium and an electronic device are provided. A first preset area is provided on a graphical user interface (GUI). A virtual joystick control is provided in the first preset area. In response to a first touch operation in the first preset area, the virtual joystick control is controlled according to the first touch operation. In a process of executing the first touch operation, in response to at least one second touch operation in the first preset area, an initial position of the at least one second touch operation is acquired. When the initial position is located in a second preset area, it is determined that the at least one second touch operation is an invalid operation. When the initial position is located in a third preset area, the virtual joystick control is controlled according to the at least one second touch operation to control the movement of the virtual character. The present disclosure improves the operation efficiency of a game as well as the experience of a player during game playing.

20 Claims, 5 Drawing Sheets

(51) Int. Cl.
  *A63F 13/55* (2014.01)
  *G06F 3/0488* (2022.01)
(52) U.S. Cl.
  CPC .... *G06F 3/0488* (2013.01); *A63F 2300/1075* (2013.01); *A63F 2300/308* (2013.01); *A63F 2300/6045* (2013.01); *G06F 2203/04104* (2013.01)

(56) References Cited

U.S. PATENT DOCUMENTS

| | | | |
|---|---|---|---|
| 9,910,541 B2* | 3/2018 | Hao | G06F 3/0488 |
| 10,606,408 B2* | 3/2020 | Lee | G06F 3/04186 |
| 2012/0169610 A1* | 7/2012 | Berkes | G06F 3/04883 |
| | | | 345/173 |
| 2013/0217498 A1 | 8/2013 | Wang | |
| 2013/0265276 A1* | 10/2013 | Obeidat | G06F 3/041662 |
| | | | 345/174 |
| 2014/0049502 A1* | 2/2014 | Santos | G06F 3/038 |
| | | | 345/174 |
| 2014/0256439 A1 | 9/2014 | Wang et al. | |

FOREIGN PATENT DOCUMENTS

| | | |
|---|---|---|
| CN | 107168611 A | 9/2017 |
| CN | 206833410 U | 1/2018 |
| CN | 107741818 A | 2/2018 |
| CN | 107741819 A | 2/2018 |
| CN | 108579077 A | 9/2018 |

\* cited by examiner

Fig. 2 a first preset area is provided on the GUI, a virtual joystick control is provided in the first preset area, and in response to a first touch operation in the first preset area, the virtual joystick control is controlled according to the first touch operation, wherein the virtual joystick control is used for controlling the movement of the virtual character in the game scene — S1 in a process of executing the first touch operation, in response to at least one second touch operation in the first preset area, an initial position of the at least one second touch operation is acquired; when the initial position is located in a second preset area, it is determined that the at least one second touch operation is an invalid operation; and when the initial position is located in a third preset area, the virtual joystick is controlled according to the at least one second touch operation to control the movement of the virtual character, the first preset area including the second preset area, and the third preset area including an area other than the second preset area in the first preset area — S2

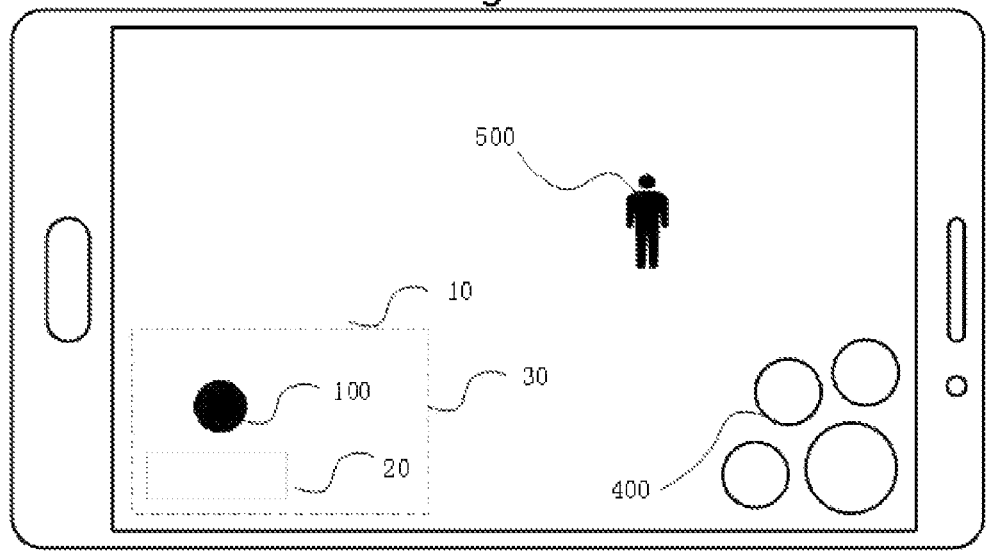

Fig. 3

INFORMATION PROCESSING METHOD AND APPARATUS, STORAGE MEDIUM, AND ELECTRONIC DEVICE

CROSS-REFERENCE TO RELATED APPLICATIONS

The present application claims benefit of Chinese Patent Application No. 201810200907.0, filed to the China Patent Office on Mar. 12, 2018, entitled "Information Processing Method and Apparatus, Storage Medium, and Electronic Device", the contents of which are hereby incorporated by reference in its entirety.

TECHNICAL FIELD

The present disclosure relates to the technical field of human-computer interaction, and more particularly to an information processing method and apparatus, a storage medium, and an electronic device.

BACKGROUND

In various types of games currently running on mobile devices, players control the movement of virtual characters in the games by finger-based touch operations on interfaces. In order to give the players sufficient visual feedback, a virtual joystick 200 is usually arranged on the interface as shown in FIG. 1, so as to control the movement of a virtual character A.

For the joystick control of a mobile game in the related art, it is generally prohibited to operate the joystick through multi-touch. For example, when a finger triggers a touch area on a screen of a mobile terminal, the joystick is controlled by the touch operation. As long as the touch operation is not ended, that is, the finger does not release, any other multi-touches located in a touch area will not be respond.

It is to be noted that the information disclosed in the Background is only for enhancement of understanding of the background of the disclosure, and thus may include information that does not constitute the conventional art known to those of ordinary skill in the art.

SUMMARY

The objective of the present disclosure is to provide an information processing method and apparatus, a storage medium and an electronic device, which overcome, at least to some extent, one or more problems due to limitations and disadvantages of the related art.

According to an aspect of the present disclosure, an information processing method is provided, applied to a mobile terminal which is rendered with a graphical user interface (GUI), contents rendered on the GUI at least comprising part of a game scene, and at least one virtual character, which may include the following steps:

Providing a first preset area on the GUI, providing a virtual joystick control in the first preset area, and in response to a first touch operation in the first preset area, controlling the movement of the virtual character in the game scene according to the first touch operation.

In a process of executing the first touch operation, in response to at least one second touch operation in the first preset area, acquiring an initial position of the at least one second touch operation. And when the initial position is located in a second preset area, determining that the at least one second touch operation is an invalid operation, and when the initial position is located in a third preset area, controlling the movement of the virtual character according to the at least one second touch operation on the virtual joystick control.

The first preset area may include the second preset area, and the third preset area may include an area other than the second preset area in the first preset area.

According to an aspect of the present disclosure, an information processing apparatus, applied to a mobile terminal which is rendered with a graphical user interface (GUI), contents rendered on the GUI at least comprising part of a game scene, and at least one virtual character, which may include the following modules:

a first control module, configured to provided a first preset area on the GUI, providing a virtual joystick control in the first preset area, and in response to a first touch operation in the first preset area, controlling the movement of the virtual character in the game scene according to the first touch operation; and a second control module, configured to, in a process of executing the first touch operation, in response to at least one second touch operation in the first preset area, acquiring an initial position of the at least one second touch operation.

The first preset area may include the second preset area, and the third preset area may include an area other than the second preset area in the first preset area.

According to an aspect of the present disclosure, a computer-readable storage medium is provided. in which computer program may be stored. The computer program may be executed by a processor to implement the information processing method according above.

According to an aspect of the present disclosure, an electronic device is provided. The electronic device may include:

a processor; and a memory, configured to store an executable instruction of the processor.

The processor may be configured to execute the information processing method above by executing the executable instruction.

An exemplary embodiment of the present disclosure provides an information processing method and apparatus, a storage medium, and an electronic device. In a process of controlling the virtual joystick control by the first touch operation, detecting at least one second touch operation located in the first preset area, and the validity of the second touch operation is determined by determining the initial position of the at least one second touch operation, thereby switching the control right of the virtual joystick control from the first touch operation to the at least one second touch operation according to the corresponding valid touch operation. The solution of the present disclosure efficiently solves the accurate regression problem of the control right of the virtual joystick control for at least one second touch operation after the first touch operation triggers the control function of the virtual joystick control. Meanwhile, by setting a valid area for the initial position of the at least one second touch operation, the control right of the virtual joystick control is prevented from being deprived by a misoperation.

It is to be understood that the above general description and the following detailed description are intended to be illustrative and not restrictive. The present disclosure cannot be limited.

BRIEF DESCRIPTION OF THE DRAWINGS

The above and other features and advantages of the present disclosure will become more apparent from the detailed description of exemplary embodiments with reference to the drawings. It is apparent that the drawings in the following description are only some embodiments of the present disclosure, and other drawings can be obtained from those skilled in the art according to these drawings without any creative work. In the drawings:

FIG. 2 illustrates a flowchart of an information processing method according to the present disclosure;

FIG. 3 illustrates a schematic diagram of a graphical user interface in an exemplary embodiment of the present disclosure;

DETAILED DESCRIPTION OF THE EMBODIMENTS

Figure 1:
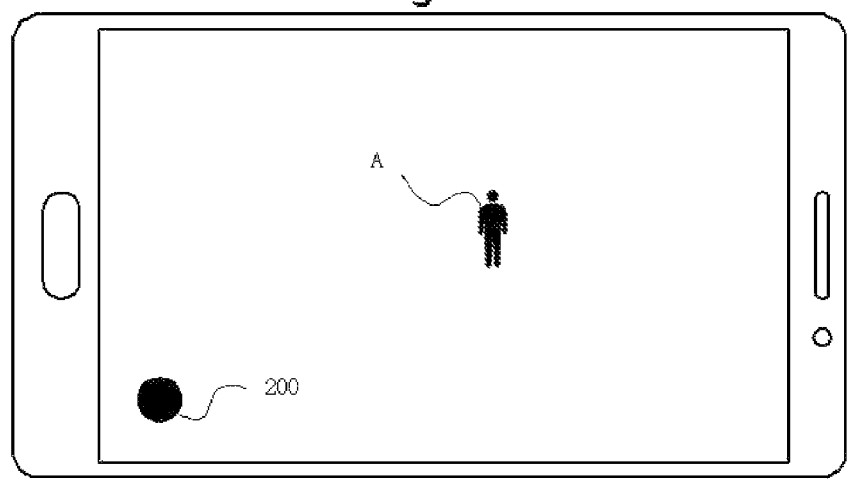
FIG. 1 illustrates a schematic diagram of a graphical user interface of a mobile game in the related art.

Example embodiments will now be described more fully with reference to the accompanying drawings. However, the exemplary embodiments can be embodied in a variety of forms and should not be construed as being limited to the embodiments set forth herein. Rather, these embodiments are provided so that the present disclosure will be thorough and complete, and the concepts of the exemplary embodiments are fully conveyed to those skilled in the art. The same reference numerals in the drawings denote the same or similar parts, and the repeated description thereof will be omitted.

Furthermore, the described features, structures, or characteristics may be combined in any suitable manner in one or more embodiments. In the following description, numerous specific details are provided for fully understanding the embodiments of the present disclosure. However, those skilled in the art will appreciate that the technical solution of the present disclosure may be practiced without one or more of the specific details, or other methods, components, materials, devices, steps, etc. may be employed. In other instances, well-known structures, methods, devices, implementations, materials, or operations are not shown or described in detail to avoid obscuring aspects of the present disclosure.

The block diagrams shown in the figures are merely functional entities and do not necessarily have to correspond to physically separate entities. That is, these functional entities may be implemented in software, or these functional entities or a portion of the functional entities may be implemented in one or more software-hardened modules, or these functional entities are implemented in different networks and/or processor devices and/or micro-controller devices.

In the conventional art, since the first triggered touch operation obtains full control of a joystick, a player must ensure that an initial trigger position of a touch operation is accurate. If the initial trigger position is generated according to a misoperation, it is necessary to find a misoperation point and end such misoperation, and then the player may trigger a correct operation. For a general mobile device, there are certain non-screen areas reserved at both ends of the device. It is not easy for a user to trigger such misoperation in a screen area when the user holds the device, so that the initial trigger position is rarely generated according to the misoperation. However, with the development of narrow-frame and full-screen touch devices, the above solutions will cause troubles of misoperation. For example, at lower left sides of frames of some narrow-frame mobile phones, sometimes a palm part of a left hand may cause a misoperation. At this time, a joystick operation could be triggered after the palm leaving from the screen (generally as the left hand leaving from screen of the device). For another example, some players are accustomed to trigger the movement of a joystick with a left thumb lying horizontally on the screen. It is possible that the joint in the middle of the thumb is first pressed to the screen, and there is also the problem that the finger has to be released from the screen after the misoperation. For the triggering and controlling of a virtual joystick in a game, it is obviously necessary to deal with the multi-touch compatible response to solve the conflict between multiple touch operations in the game.

An information processing method is first disclosed in the present exemplary embodiment, and is applied to a touch terminal capable of presenting a graphical user interface (GUI). The content displayed by the GUI at least partially includes a game scene, and at least partially includes a virtual character. The touch terminal may be, for example, an electronic device with a touch screen such as a mobile phone, a tablet computer, a notebook computer, a game machine, or a PDA. A game application may control a touch screen of the touch terminal to display a virtual character and a virtual joystick area including a virtual joystick, a virtual battle scene, a virtual natural environment, and the like through an application interface of the touch terminal. An interaction interface may be an entire area of the touch screen or a partial area of the touch screen, which is not specifically limited in the present exemplary embodiment. The virtual character refers to a game character that is controlled by a user, and is displayed in the interaction interface in a partial or overall form of the game character. For example, in a first person perspective, the content of the interaction interface is presented in a master control perspective of the user. The immersive experience of the user is enhanced, and only part of the game character, such as the hand or foot, can be seen in the interface. In the third person perspective, the game character may be presented in the interaction interface as a whole, reducing the control difficulty and dizziness of the user. Moreover, the motion of an image is more emphasized, a developer can select a specific display mode according to the content of the game, and the present disclosure is not limited thereto.

As shown in FIG. 2, an information processing method is first disclosed in the present exemplary embodiment, which is applied to a mobile terminal which is rendered with a graphical user interface (GUI), contents rendered on the GUI at least comprising part of a game scene, and at least one virtual character. The method includes the following steps:

At step S1, a first preset area is provided on the GUI, a virtual joystick control is provided in the first preset area, and in response to a first touch operation in the first preset area, the virtual joystick control is controlled according to the first touch operation, wherein the virtual joystick control is used for controlling the movement of the virtual character in the game scene.

At step S2, in a process of executing the first touch operation, in response to at least one second touch operation in the first preset area, an initial position of the at least one second touch operation is acquired; when the initial position is located in a second preset area, it is determined that the at least one second touch operation is an invalid operation; and when the initial position is located in a third preset area, the virtual joystick is controlled according to the at least one second touch operation to control the movement of the virtual character, the first preset area including the second preset area, and the third preset area including an area other than the second preset area in the first preset area.

According to the information processing method in the present exemplary embodiment, during the control of the virtual joystick control by the first touch operation, at least one second touch operation located in the first preset area is detected, and the validity of the at least one second touch operation is determined by determining the initial position of the at least one second touch operation, thereby switching the control right of the virtual joystick control from the first touch operation to the at least one second touch operation according to the corresponding valid touch operation. The solution of the present disclosure efficiently solves the accurate regression problem of the control right of the virtual joystick control for at least one second touch operation after the first touch operation triggers the control function of the virtual joystick control. Meanwhile, by setting a valid area for the initial position of the at least one second touch operation, the control right of the virtual joystick control is prevented from being deprived by a misoperation. The information processing method of the present embodiment is further described below with reference to FIG. 3 to FIG. 6.

As shown in FIG. 3, a graphical user interface is rendered on a mobile terminal. A first preset area 10 is provided on the GUI. A virtual joystick control 100 is provided in the first preset area 10. The shown virtual joystick control 100 may be either resident on the GUI (usually located at the lower left of the screen) or in an area where a player touch may trigger the virtual joystick control 100 (usually located at the bottom left of the screen and the area being larger than the virtual joystick control 100) and displayed thereon. Depending on different game types or content, at least one skill control 400 may be selectively provided in the lower right corner of the GUI. In response to the first touch operation in the first preset area 10, the virtual joystick control 100 is controlled according to the first touch operation. The first touch operation triggers the virtual joystick control 100 by similar touch media such as a player finger or a stylus to control the movement of a virtual character 500 in the game scene. The virtual character 500 may be a game character that is controlled by a player, and is displayed on the GUI in a partial or overall form of the game character. For example, in a first person perspective, the content of the GUI is presented in a master control perspective of the player. The immersive experience of the player is enhanced, and only part of the game character, such as the hand or foot of the game character, can be seen in the interface. In the third person perspective, the game character may be presented in the GUI as a whole, reducing the control difficulty and dizziness of the player. Moreover, the motion of an image is more emphasized, a developer or the player can select a specific display mode according to the type or content of the game, and the present disclosure is not limited thereto.

In a process of executing the first touch operation, in response to at least one second touch operation in the first preset area 10, an initial position of the second touch operation is acquired. If the initial position is located in the at least one second preset area 20, it is determined that the at least one second touch operation is an invalid operation. At this time, the virtual joystick control 100 is still controlled according to the first touch operation. If the initial position is located in a third preset area 30, the virtual joystick control 100 is controlled according to the second touch operation to control the movement of the virtual character. The first preset area 10 includes the second preset area 20, and the third preset area 30 is an area other than the second preset area 20 in the first preset area 10. In the present embodiment, by providing a second preset area 20 and determining whether the initial position of the at least one second touch operation is located in the second preset area 20, it is determined whether at least one second touch operation included in the multi-touch is a valid operation, and the control of the virtual joystick control 100 is accurately triggered to avoid the problem of a poor game experience of the player when game playing due to a misoperation.

As an alternative, after controlling, when the second touch operation is located in the third preset area 30, controlling the movement of the virtual character 500 according to the at least one second touch operation on the virtual joystick control 100, the method further includes: in response to the end of the second touch operation, controlling the movement of the virtual character 500 according to the at least one second touch operation on the virtual joystick control 100. When the first touch operation is ended, the current touch state is switched from multi-touch to single touch, and the virtual joystick control 100 is controlled by the at least one second touch operation.

As an alternative, after controlling, when the second touch operation is located in the third preset area 30, controlling the movement of the virtual character 500 according to the at least one second touch operation on the virtual joystick control 100, the method further includes: in response to the end of the second touch operation, controlling a position of the virtual joystick control 100 is recovered. In this case, the virtual joystick control 100 is controlled by the at least one second touch operation, and at the end of the second touch operation, the virtual joystick control 100 returns to the initial position. By recording the initial position of the virtual joystick control 100 triggered according to the touch operation or a resident preset virtual joystick control, when the touch operation according to the virtual joystick control 100 is ended, the virtual joystick control 100 returns to the initial position to remind the player of the ending of the current touch operation, and a new touch operation may be performed on the virtual joystick control 100.

As an alternative, after controlling, in response to the end of the second touch operation, controlling a position of the virtual joystick control 100 is recovered, the method further includes: when detecting the first touch operation is displaced, controlling the virtual joystick control 100 according to the first touch operation. If the first touch operation is not ended when the second touch operation is ended, the first touch operation is regarded as a valid operation when it is detected that the first touch operation has a sliding displacement, and the virtual joystick control 100 is controlled according to the first touch operation. By confirming the validity of the first touch operation, the finger that has not left the touch screen continues to perform the touch operation on the virtual joystick control 100, thereby further improving the efficiency of the touch operation.

Figure 4:
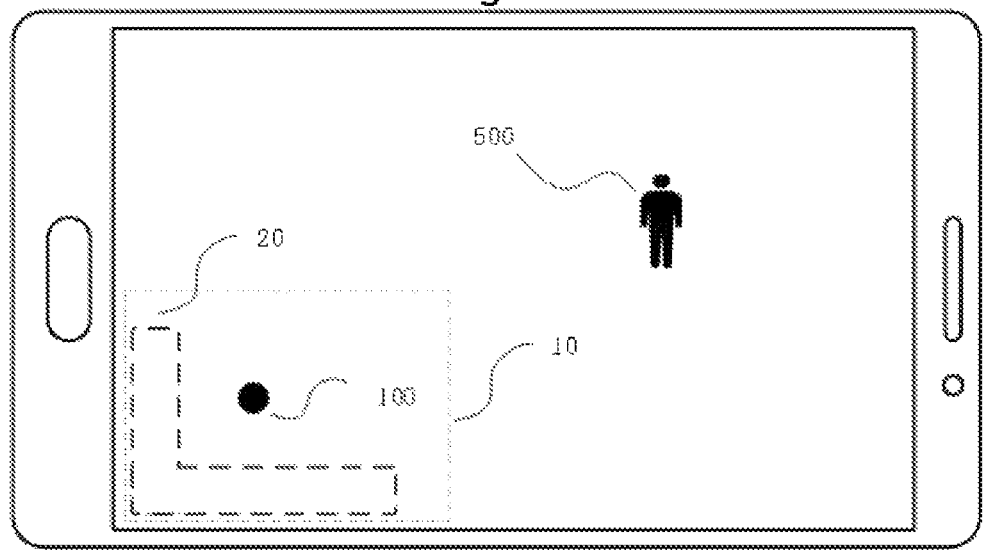
FIG. 4 illustrates a schematic diagram of a second preset area in an exemplary embodiment of the present disclosure.

As an alternative, as shown in FIG. 4, the second preset area 20 is set as an L-shaped area located at a lower left corner of the first preset area 10. This setting is according to the conventional operating habits of the user. When a finger (usually the thumb) of the left hand of the player controls the virtual joystick control 100, the palm easily falsely touches the screen edge of the mobile terminal, thereby causing misoperation. Therefore, the L-shaped area which is easily falsely touched by the palm is used as the second preset area 20 determining that the second touch operation is an invalid operation, thereby reducing the misoperation rate of the game.

Figure 5:
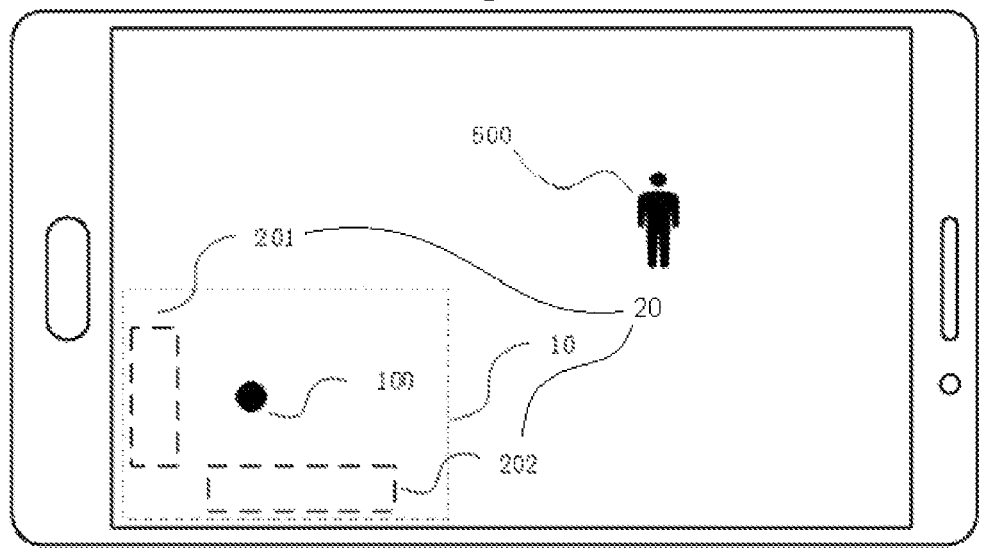
FIG. 5 illustrates a schematic diagram of multiple second preset areas included in another exemplary embodiment of the present disclosure.

As an alternative, according to different user operation habits or specific game content, as shown in FIG. 5, multiple second preset areas 201, 202 may be arranged in the first preset area 10 to better prevent the occurrence of misoperation. The present disclosure is not limited thereto.

Figure 6:
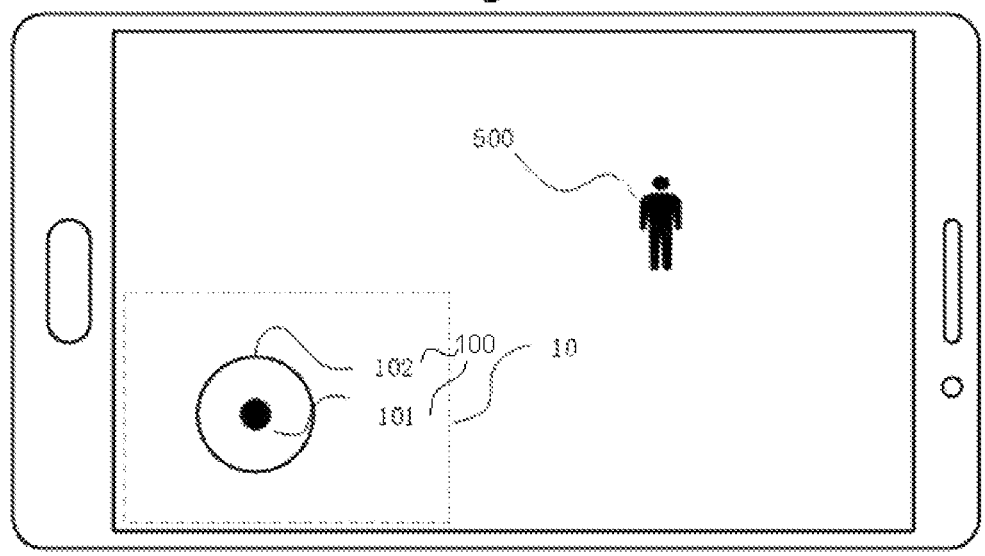
FIG. 6 illustrates a schematic diagram of a virtual operation control in another exemplary embodiment of the present disclosure.

As an alternative, as shown in FIG. 6, the virtual joystick control 100 includes: a joystick handle 101 and a base 102, the base 102 following the joystick handle 101 to move in the GUI. The movement of the virtual character in the game scene is according to the touch operation on the virtual joystick control 100. In order to improve the flexibility of the virtual joystick control 100, the base may be fixedly displayed at a certain position on the GUI in different game settings (usually a lower left corner of the GUI), and the joystick handle follows the touch operation to move, thereby better giving the player clear visual feedback during the game. Meanwhile, in order to improve the operability of the virtual joystick control 100, it may be set that when the movement of the joystick handle 101 exceeds a preset distance range, the base moves along with the joystick handle 101. The above settings may be depending on specific demands of the game developer or the user. The present disclosure is not limited thereto.

As an alternative, the step of controlling, when detecting the end of the first touch operation, controlling the movement of the virtual character 500 according to the at least one second touch operation on the virtual joystick control 100 includes: when detecting the end of the first touch operation, and an initial position of each of at least two second touch operations is on the third preset area 30, at least performing one of the following operations: acquiring a trigger point of each second touch operation respectively, and controlling the movement of the virtual character 500 according to the second touch operation with the earliest trigger point on the virtual joystick control 100; or acquiring a displacement of each second touch operation respectively, and controlling the movement of the virtual character 500 according to the second touch operation of which the displacement first reaches a preset threshold on the virtual joystick control 100. The trigger point refers to the trigger time of each second touch operation.

As shown in FIG. 3, when it is detected that the first touch operation is ended, two second touch operations are detected: a second touch operation A and a second touch operation B, where the initial positions of the second touch operations A and B are both located in the third preset area 30. Preferably, the trigger time of the second touch operations A and B is acquired respectively. The trigger time of the second touch operation A is 5 seconds, and the trigger time of the second touch operation is 3 seconds. At this time, the second touch operation A with the earliest trigger time controls the virtual joystick control 100. In addition, displacements of the second touch operations A and B may be acquired respectively. It is assumed that a distance threshold is 10 pixels. If the displacement of the second touch operation A is 5 pixels, the displacement of the second touch operation B is 11 pixels, and the second touch operation B of which the displacement first reaches a preset distance threshold (10 pixels) is used as an operation of controlling the virtual joystick control 100. In the case of multi-touch, when receiving multiple second touch operations, the second touch operation of controlling the virtual joystick control 100 is determined by determining the trigger time or displacements of the multiple second touch operations. The problem of multi-touch operation conflict according to the virtual joystick control 100 is solved, and the user experience of the player during game playing is improved.

Figure 7:
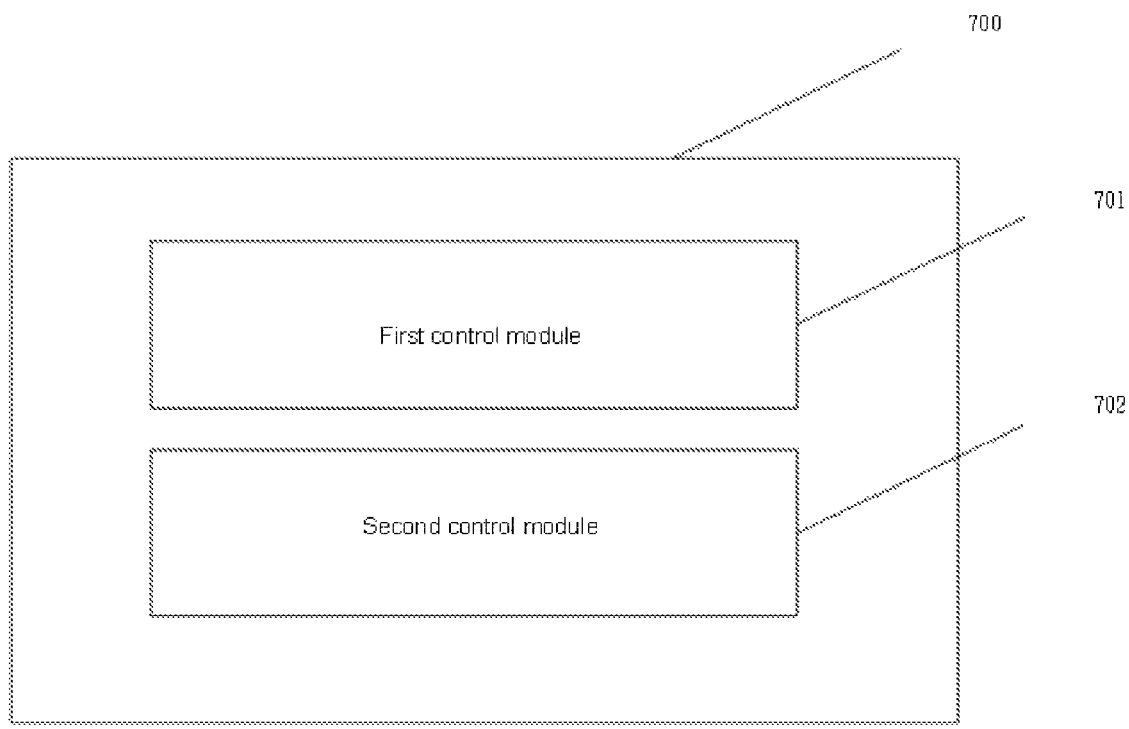
FIG. 7 illustrates a block diagram of an information processing apparatus according to an exemplary embodiment of the present disclosure.

FIG. 7 is an information processing apparatus according to an embodiment of the present disclosure, which is applied to a mobile terminal which is rendered with a graphical user interface (GUI), contents rendered on the GUI at least comprising part of a game scene, and at least one virtual character. The apparatus 700 includes a first control module 701 and a second control module 702.

The first control module 701 is configured to provided a first preset area on the GUI, providing a virtual joystick control 100 in the first preset area, and when detecting a first touch operation in the first preset area, controlling the movement of the virtual character in the game scene according to the first touch operation.

The second control module 702 is configured to: in a process of executing the first touch operation, in response to at least one second touch operation in the first preset area, acquiring an initial position of the at least one second touch operation.

The first preset area includes the second preset area, and the third preset area includes an area other than the second preset area in the first preset area.

Specific details of various module units in the above embodiment have been described in detail in the corresponding information processing method. In addition, it can be understood that the information processing apparatus further includes other unit modules corresponding to those in the information processing method. Therefore, detail descriptions are omitted herein.

It is to be noted that although several modules or units of the device for action execution are mentioned in the above detailed description, such division is not mandatory. In fact, according to the implementation manners of the disclosure, the features and functions of two or more modules or units described above may be embodied in one module or unit. Conversely, the features and functions of one module or unit described above may be further divided into multiple modules or units and embodied.

Figure 8:
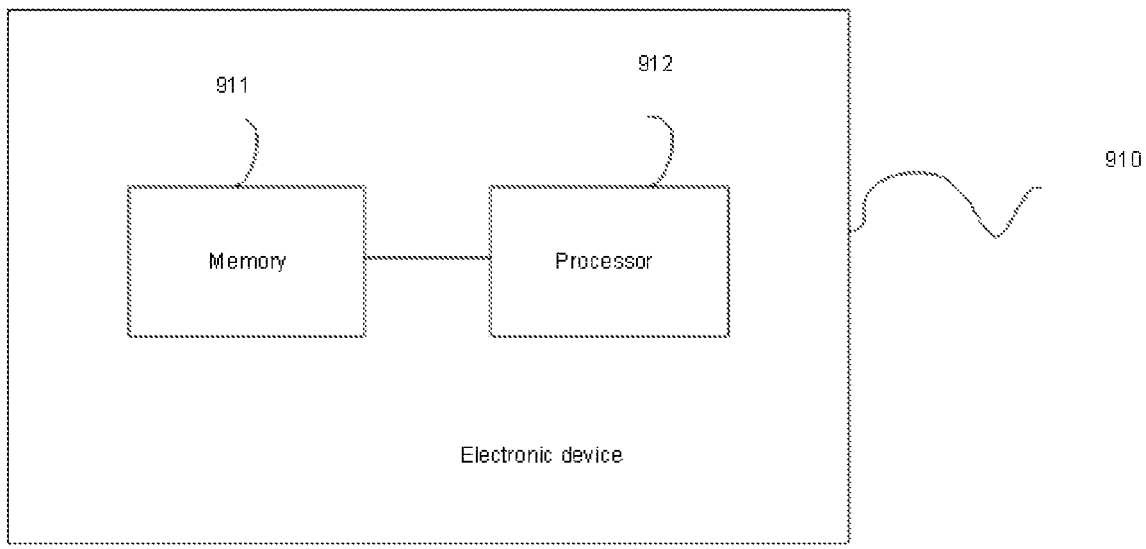
FIG. 8 illustrates a structure schematic diagram of an electronic device according to an exemplary embodiment of the present disclosure.

FIG. 8 is a structure schematic diagram of an electronic device according to one embodiment of the disclosure. As shown in FIG. 8, the electronic device 910 of the present embodiment includes: a memory 911 and a processor 912. The memory 911 and the processor 912 may be connected by a bus. A software application is executed on a processor of a terminal, and rendering is performed on a display device of the terminal to obtain a graphical user interface.

The processor 912 is provided.

The memory 911 is configured to store an executable instruction of the processor.

The processor is configured to execute the executable instruction to perform the steps as follows.

Providing a first preset area on the GUI, providing a virtual joystick control in the first preset area, and in response to a first touch operation in the first preset area, controlling the movement of the virtual character in the game scene according to the first touch operation.

In a process of executing the first touch operation, in response to at least one second touch operation in the first preset area, acquiring an initial position of the at least one second touch operation. And when the initial position is located in a second preset area, determining that the at least one second touch operation is an invalid operation, and when the initial position is located in a third preset area, controlling the movement of the virtual character according to the at least one second touch operation on the virtual joystick control.

The first preset area includes the second preset area, and the third preset area includes an area other than the second preset area in the first preset area.

In an alternative implementation manner, after controlling, when the initial position is located in the third preset area, controlling the movement of the virtual character according to the at least one second touch operation on the virtual joystick control, the method further includes:

when detecting the end of the first touch operation, controlling the movement of the virtual character according to the at least one second touch operation on the virtual joystick control.

In an alternative implementation manner, after controlling, when the initial position is located in the third preset area, controlling the movement of the virtual character according to the at least one second touch operation on the virtual joystick control, the method further includes:

in response to the end of the second touch operation, controlling a position of the virtual joystick control is recovered.

In an alternative implementation manner, after controlling, in response to the end of the second touch operation, controlling a position of the virtual joystick control is recovered, the method further includes: when detecting the first touch operation is displaced, controlling the virtual joystick control according to the first touch operation.

In an alternative implementation manner, the step of controlling, in response to the end of the first touch operation, controlling the movement of the virtual character according to the at least one second touch operation on the virtual joystick control includes:

in response to the end of the first touch operation, and an initial position of each of at least two second touch operations is in the third preset area, at least performing one of the following operations:

acquiring a trigger point of each second touch operation respectively, and controlling the movement of the virtual character according to the second touch operation with the earliest trigger point on the virtual joystick control; or acquiring a displacement of each second touch operation respectively, and controlling the movement of the virtual character according to the second touch operation of which the displacement first reaches a preset threshold on the virtual joystick control.

In an alternative implementation manner, the virtual joystick control includes: a joystick handle and a base, the base following the joystick handle to move in the GUI.

In an alternative implementation manner, the second preset area is an L-shaped area at a lower left corner of the first preset area.

By means of the information processing method provided in the exemplary embodiment of the present disclosure, in a process of executing the virtual joystick control by the first touch operation, at least one second touch operation located in the first preset area is detected, and the validity of the second touch operation is determined by determining the initial position of the second touch operation, thereby switching the control right of the virtual joystick control from the first touch operation to the at least one second touch operation according to the corresponding valid touch operation. The solution of the present disclosure efficiently solves the accurate regression problem of the control right of the virtual joystick control for at least one second touch operation after the first touch operation triggers the control function of the virtual joystick control. Meanwhile, by setting a valid area for the initial position of the second touch operation, the control right of the virtual joystick control is prevented from being deprived by a misoperation.

According to an embodiment of the present disclosure, an electronic device is also provided. The electronic device includes: a processing component, which may further include one or more processors, and a memory resource represented by a memory and configured to store an instruction executable by the processing component, such as an application. The application program stored in the memory may include one or more modules each corresponding to a set of instructions. In addition, the processing component is configured to execute instructions to perform the above-described information processing method.

The electronic device may also include: a power supply component, configured to perform power management on the electronic device; a wired or wireless network interface, configured to connect the electronic device to a network; and an input output (I/O) interface. The electronic device may operate according to an operating system stored in the memory, such as Android, iOS, Windows, Mac OS X, Unix, Linux, FreeBSD, or the like.

Figure 9:
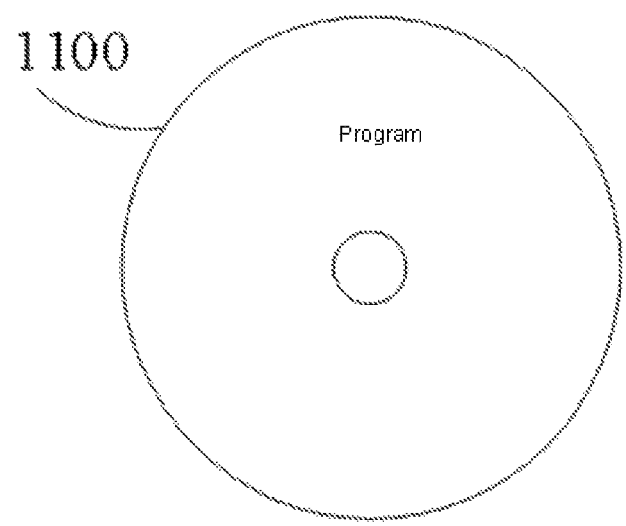
FIG. 9 illustrates a structure schematic diagram of a storage medium according to an exemplary embodiment of the present disclosure.

According to one embodiment of the present disclosure, a computer-readable storage medium is also provided. As shown in FIG. 9, there is stored thereon a program product 1100 capable of implementing the above method of the present specification, on which a computer program is stored. When executed by the processor, the computer program implements the following steps:

Providing a first preset area on the GUI, providing a virtual joystick control in the first preset area, and in response to a first touch operation in the first preset area, controlling the movement of the virtual character in the game scene according to the first touch operation.

In a process of executing the first touch operation, in response to at least one second touch operation in the first preset area, acquiring an initial position of the at least one second touch operation; and when the initial position is located in a second preset area, determining that the at least one second touch operation is an invalid operation, and when the initial position is located in a third preset area, controlling the movement of the virtual character according to the at least one second touch operation on the virtual joystick control.

The first preset area includes the second preset area, and the third preset area includes an area other than the second preset area in the first preset area.

In an alternative implementation manner, after controlling, when the initial position is located in the third preset area, controlling the movement of the virtual character according to the at least one second touch operation on the virtual joystick control, the method further includes:

In response to the end of the first touch operation, controlling the movement of the virtual character according to the at least one second touch operation on the virtual joystick control.

In an alternative implementation manner, after controlling, when the initial position is located in the third preset area, controlling the movement of the virtual character according to the at least one second touch operation on the virtual joystick control, the method further includes:

In response to the end of the second touch operation, controlling a position of the virtual joystick control is recovered.

In an alternative implementation manner, after controlling, when detecting the end of the second touch operation, controlling a position of the virtual joystick control is recovered, the method further includes: when detecting the first touch operation is displaced, the virtual joystick control is controlled according to the first touch operation.

In an alternative implementation manner, the step of controlling, in response to the end of the first touch operation, controlling the movement of the virtual character according to the at least one second touch operation on the virtual joystick control includes:

in response to the end of the first touch operation, and an initial position of each of at least two second touch operations is on the third preset area, at least performing one of the following operations:

acquiring a trigger point of each second touch operation respectively, and controlling the movement of the virtual character according to the second touch operation with the earliest trigger point on the virtual joystick control; or acquiring a displacement of each second touch operation respectively, and controlling the movement of the virtual character according to the second touch operation of which the displacement first reaches a preset threshold on the virtual joystick control.

In an alternative implementation manner, the virtual joystick control includes: a joystick handle and a base, the base following the joystick handle to move in the GUI.

In an alternative implementation manner, the second preset area is an L-shaped area at a lower left corner of the first preset area.

By means of the information processing method provided in the exemplary embodiment of the present disclosure, in a process of executing the virtual joystick control by the first touch operation, at least one second touch operation located in the first preset area is detected, and the validity of the second touch operation is determined by determining the initial position of the second touch operation, thereby switching the control right of the virtual joystick control from the first touch operation to the second touch operation according to the corresponding valid touch operation. The solution of the present disclosure efficiently solves the accurate regression problem of the control right of the virtual joystick control for at least one second touch operation after the first touch operation triggers the control function of the virtual joystick control. Meanwhile, by setting a valid area for the initial position of the second touch operation, the control right of the virtual joystick control is prevented from being deprived by a misoperation.

The computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, device or apparatus.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will readily understand that the example implementation manners described herein may be implemented by software or by software in combination with necessary hardware. Therefore, the technical solution according to the embodiment of the disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the disclosure.

Other embodiments of the disclosure will be apparent to those skilled in the art after considering the specification and practicing the disclosure herein. The present application is intended to cover any variations, uses, or adaptations of the disclosure, which are in accordance with the general principles of the disclosure and include common general knowledge or conventional technical means in the art that are not disclosed in the disclosure. The specification and examples are to be regarded as illustrative only, and the true scope and spirit of the disclosure are pointed out by the claims.

It is to be understood that the disclosure is not limited to the accurate structure that have been described and shown in the drawings, and may make various modifications and variations without departing the scope thereof. The scope of the disclosure is limited only by the appended claims.

INDUSTRIAL APPLICABILITY

By means of the method provided in the embodiment of the present disclosure, in a process of executing the virtual joystick control by the first touch operation, at least one second touch operation located in the first preset area is detected, and the validity of the second touch operation is determined by determining the initial position of the second touch operation, thereby switching the control right of the virtual joystick control from the first touch operation to the second touch operation according to the corresponding valid touch operation. The solution of the present disclosure efficiently solves the accurate regression problem of the control right of the virtual joystick control for at least one second touch operation after the first touch operation triggers the control function of the virtual joystick control. Meanwhile, by setting a valid area for the initial position of the second touch operation, the control right of the virtual joystick control is prevented from being deprived by a misoperation.

What is claimed is:

1. An information processing method, applied to a mobile terminal which is rendered with a graphical user interface (GUI), contents rendered on the GUI at least comprising part of a game scene, and at least one virtual character, the method comprising:
providing a first preset area on the GUI, providing a virtual joystick control in the first preset area, and in response to a first touch operation in the first preset area, controlling the movement of the virtual character in the game scene according to the first touch operation;
in a process of executing the first touch operation, wherein the first touch operation is continuously detected in the first preset area in response to at least one second touch operation in the first preset area, acquiring an initial position of the at least one second touch operation, wherein the current touch state of the mobile terminal is multi-touch; and when the initial position is located in a second preset area, determining that the at least one second touch operation is an invalid operation, controlling the movement of the virtual character according to the first touch operation, and when the initial position is located in a third preset area, controlling the movement of the virtual character according to the at least one second touch operation on the virtual joystick control, wherein the first preset area comprises the second preset area, and the third preset area comprises an area other than the second preset area in the first preset area.

2. The method as claimed in claim 1, wherein after controlling, when the initial position is located in the third preset area, controlling the movement of the virtual character according to the at least one second touch operation on the virtual joystick control, the method further comprises:

in response to the end of the first touch operation, controlling the movement of the virtual character according to the at least one second touch operation on the virtual joystick control.

3. The method as claimed in claim 2, wherein the step of controlling, in response to the end of the first touch operation, controlling the movement of the virtual character according to the at least one second touch operation on the virtual joystick control comprises:

in response to the end of the first touch operation, and an initial position of each of at least two second touch operations is in the third preset area, performing the following operations:

acquiring a trigger point of each second touch operation respectively, and controlling the movement of the virtual character according to the second touch operation with the earliest trigger point on the virtual joystick control.

4. The method as claimed in claim 2, wherein the step of controlling, in response to the end of the first touch operation, controlling the movement of the virtual character according to the at least one second touch operation on the virtual joystick control comprises:

in response to the end of the first touch operation, and an initial position of each of at least two second touch operations is in the third preset area, performing the following operations:

acquiring a displacement of each second touch operation respectively, and controlling the movement of the virtual character according to the second touch operation of which the displacement first reaches a preset threshold on the virtual joystick control.

5. The method as claimed in claim 1, wherein after controlling, when the initial position is located in the third preset area, controlling the movement of the virtual character according to the at least one second touch operation on the virtual joystick control, the method further comprises:

in response to the end of the second touch operation, controlling the virtual joystick control to return to the initial position.

6. The method as claimed in claim 5, wherein after controlling, in response to the end of the second touch operation, controlling the virtual joystick control to return to the initial position, the method further comprises: when detecting the first touch operation has a sliding displacement, controlling the virtual joystick control according to the first touch operation.

7. The method as claimed in claim 5, wherein when the second touch operation according to the virtual joystick control is ended, the virtual joystick control returns to the initial position to remind the player of the ending of the current touch operation, and a new touch operation could be performed on the virtual, joystick control.

8. The method as claimed in claim 1, wherein the virtual joystick control comprises: a joystick handle and a base, the base is arranged to follow the movement of the joystick handle on the GUI.

9. The method as claimed in claim 8, wherein the base fixedly displayed at a certain position on the GUI in different game settings.

10. The method as claimed in claim 8, wherein when the movement of the joystick handle exceeds a preset distance range, the base moves along with the joystick handle.

11. The method as claimed in claim 1, wherein the second preset area is an L-shaped area at a lower left corner of the first preset area.

12. A non-transitory storage medium, on which a computer program is stored, wherein the computer program is executed by a processor to implement the information processing method as claimed in claim 1.

13. An electronic device, comprising:
a processor; and
a memory, configured to store an executable instruction of the processor,
wherein the processor is configured to execute the information processing method as claimed in claim 1 by executing the executable instruction.

14. The method as claimed in claim 1, wherein the virtual joystick control is resident on the GUI.

15. The method as claimed in claim 1, wherein the virtual joystick control is displayed on the GUI after an area which could trigger the virtual joystick control is triggered.

16. The method as claimed in claim 15, wherein the area located at the bottom left of the GUI.

17. The method as claimed in claim 15, wherein the area being larger than the virtual joystick control.

18. The method as claimed in claim 1, wherein When the first touch operation is ended, the current touch state is switched from multi-touch to single touch, and the virtual joystick control is controlled by the at least one second touch operation.

19. The method as claimed in claim 1, wherein at least one skill control provided in the lower right corner of the GUI.

20. An information processing apparatus, applied to a mobile terminal which is rendered with a graphical user interface (GUI), contents rendered on the GUI at least comprising part of a game scene, and at least one virtual character, the apparatus comprising:

a first control module, configured to provide a first preset area on the GUI, providing a virtual joystick control in the first preset area, and in response to a first touch operation in the first preset area, controlling the movement of the virtual character in the game scene according to the first touch operation; and a second control module, configured to in a process of executing the first touch operation, wherein the first touch operation is continuously detected in the first preset area, in response to at least one second touch operation in the first preset area, acquiring an initial position of the at least one second touch operation, wherein the current touch state of the mobile terminal is multi-touch; when the initial position is located in a second preset area, determining that the at least one second touch operation is an invalid operation, controlling the movement of the virtual character according to the first touch operation, and when the initial position is located in a third preset area, controlling the movement of the virtual character according to the at least one second touch operation on the virtual joystick control wherein the first preset area comprises the second preset area, and the third preset area comprises an area other than the second preset area in the first preset area.

* * * * *